(12) United States Patent
Kim et al.

(10) Patent No.: US 10,464,295 B2
(45) Date of Patent: Nov. 5, 2019

(54) PROTECTIVE FILM AND ELECTRONIC APPLIANCE INCLUDING THE SAME

(71) Applicant: SAMSUNG ELECTRONICS CO., LTD., Suwon-si, Gyeonggi-do (KR)

(72) Inventors: Do-Hwan Kim, Gwangju (KR); Chang Hyun Park, Paju-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 69 days.

(21) Appl. No.: 15/717,339

(22) Filed: Sep. 27, 2017

(65) Prior Publication Data

US 2018/0086038 A1    Mar. 29, 2018

(30) Foreign Application Priority Data

Sep. 28, 2016 (KR) ......................... 10-2016-0125159

(51) Int. Cl.
| | |
|---|---|
| *B32B 27/32* | (2006.01) |
| *B32B 7/12* | (2006.01) |
| *B32B 27/08* | (2006.01) |
| *B32B 27/34* | (2006.01) |
| *B32B 27/36* | (2006.01) |
| *B32B 27/38* | (2006.01) |
| *F25D 23/02* | (2006.01) |
| *F25D 23/06* | (2006.01) |
| *F25D 23/00* | (2006.01) |
| *F25D 11/02* | (2006.01) |

(52) U.S. Cl.
CPC ................ *B32B 27/32* (2013.01); *B32B 7/12* (2013.01); *B32B 27/08* (2013.01); *B32B 27/34* (2013.01); *B32B 27/365* (2013.01); *B32B 27/38* (2013.01); *F25D 23/00* (2013.01); *F25D 23/02* (2013.01); *F25D 23/065* (2013.01); *B32B 2307/518* (2013.01); *B32B 2367/00* (2013.01); *B32B 2509/10* (2013.01); *F25D 11/02* (2013.01); *F25D 2400/18* (2013.01); *F25D 2400/32* (2013.01)

(58) Field of Classification Search
CPC ...................................................... B32B 27/32
See application file for complete search history.

(56) References Cited

U.S. PATENT DOCUMENTS

| | | | | |
|---|---|---|---|---|
| 4,889,576 A | * | 12/1989 | Suganuma | .......... B29C 65/5057 156/249 |
| 2001/0051782 A1 | * | 12/2001 | Kinoshita | ............... A61L 15/24 602/52 |
| 2007/0042654 A1 | * | 2/2007 | Arakawa | .............. H05K 9/0096 442/1 |
| 2014/0093712 A1 | * | 4/2014 | Tong | ....................... C08L 69/00 428/220 |
| 2018/0162035 A1 | * | 6/2018 | Dou | ....................... B29C 48/154 |
| 2018/0281361 A1 | * | 10/2018 | Oda | ....................... B32B 27/00 |

FOREIGN PATENT DOCUMENTS

| | | |
|---|---|---|
| JP | 2004-189972 | 7/2004 |
| JP | 2010-42580 | 2/2010 |
| KR | 10-2005-0016180 | 2/2005 |
| KR | 10-2012-0046999 | 5/2012 |
| KR | 10-2014-0037160 | 3/2014 |

* cited by examiner

*Primary Examiner* — Jeffrey C Mullis
(74) *Attorney, Agent, or Firm* — Staas & Halsey LLP

(57) ABSTRACT

Disclosed herein are a protective film having a structure capable of protecting an adherend and an electronic appliance including the same. The protective film includes a protection layer comprising polyolefin, and an adhesive layer laminated on the protection layer and comprising a silicone adhesive.

18 Claims, 16 Drawing Sheets

FIG. 10

| LOW-TEMPERATURE CURING POLYMER | DILUENT | CURING AGENT | PRIMER |
|---|---|---|---|
| WEIGHT RATIO: 100% | BASED ON WEIGHT OF THE LOW-TEMPERATURE CURING POLYMER 300~500% | BASED ON WEIGHT OF THE LOW-TEMPERATURE CURING POLYMER 1~4% | BASED ON WEIGHT OF THE LOW-TEMPERATURE CURING POLYMER 0.5~3% |

FIG. 11

| BASE LAYER | BONDING LAYER | THIRD LAYER | SECOND LAYER | FIRST LAYER | ADHESIVE LAYER |
|---|---|---|---|---|---|
| 60~80 | 60~80 | 70~85 | 70~90 | 70~85 | 70~85 |

PROTECTIVE FILM AND ELECTRONIC APPLIANCE INCLUDING THE SAME

CROSS-REFERENCE TO RELATED APPLICATION(S)

This application claims the benefit of Korean Patent Application No. 10-2016-0125159, filed on Sep. 28, 2016 in the Korean Intellectual Property Office, the disclosure of which is incorporated herein by reference.

BACKGROUND

1. Field

Embodiments of the present disclosure relate to a protective film and an electronic appliance including the same, and more particularly, to a protective film having a structure capable of protecting an adherend and an electronic appliance including the same.

2. Description of the Related Art

Protective films have been used to protect surfaces of metal plates such as stainless steel plates, aluminum plates, and steel plates, automobiles, and electronic appliances from scratches or contamination while these products are processed or transported.

A protective film may include a base layer and an adhesive layer. In general, the base layer may be formed of polyethylene PE and the adhesive layer may be formed of acrylic.

When a protective film including polyethylene and acrylic is used for a long period of time, reliability of physical properties may deteriorate and acrylic transition may occur. In addition, since the protective film including polyethylene and acrylic has a stronger adhesive force to an adherend over time, the adherend may be damaged or residues may remain on the adherend when detaching the protective film from the adherend. Also, the protective film including polyethylene and acrylic may be adhered to the adherend in a corrugated state.

Recently, research has been conducted on various protective films to replace protective films including polyethylene and acrylic due to these problems.

SUMMARY

Therefore, it is an aspect of the present disclosure to provide a protective film having an improved structure capable of protecting an adherend from contamination and an electronic appliance including the same.

It is another aspect of the present disclosure to provide a protective film having an improved structure capable of protecting an adherend from scratches and an electronic appliance including the same.

It is another aspect of the present disclosure to provide a protective film having an improved structure with no residue remained during detachment thereof, and an electronic appliance including the same.

Additional aspects of the disclosure will be set forth in part in the description which follows and, in part, will be obvious from the description, or may be learned by practice of the disclosure.

In accordance with one aspect of the present disclosure, a protective film includes a protection layer comprising polyolefin, and an adhesive layer laminated on the protection layer and comprising a silicone adhesive.

The polyolefin includes at least one of oriented polypropylene, polyethylene, and polyurethane.

The protection layer includes a first layer laminated on the adhesive layer and comprises random-polypropylene, a third layer comprising homo-polypropylene, and a second layer disposed between the first layer and the third layer and comprising ter-polypropylene.

The silicone adhesive includes a low-temperature curing silicone adhesive.

In accordance with one aspect of the present disclosure, the protective film further includes a base layer laminated on the protection layer to allow the protection layer to be disposed between the adhesive layer and the base layer.

The base layer includes at least one of polyethylene terephthalate, biaxially oriented polypropylene, polycarbonate, polyamide, and polyurethane.

In accordance with one aspect of the present disclosure, the protective film further includes a bonding layer disposed between the base layer and the protection layer.

The bonding layer includes at least one of an epoxy-based, urethane-based, rubber-based, and acrylic-based resin.

The low-temperature curing silicone adhesive cures at a temperature of from 65° C. to 95° C.

The low-temperature curing silicone adhesive has heat resistance at a temperature of 200° C. less.

In accordance with another aspect of the present disclosure, an electronic appliance includes a main body configured to define an appearance, an inner space formed inside the main body and a protective film detachably adhered to at least one portion of the main body. The protective film includes a protection layer comprising polyolefin, and an adhesive layer laminated on the protection layer and comprising a silicone adhesive.

The main body has a metallic region, and the protective film is adhered to at least one portion of the metallic region.

The polyolefin includes at least one of oriented polypropylene, polyethylene, and polyurethane.

The protection layer includes a first layer laminated on the adhesive layer and comprising random-polypropylene, a third layer comprising homo-polypropylene, and a second layer disposed between the first layer and the third layer and comprising ter-polypropylene.

The first layer, the second layer, and the third layer have a thickness ratio of 1 to 4:2 to 8:1 to 4.

The silicone adhesive comprises a low-temperature curing silicone adhesive curing at a temperature of from 65° C. to 95° C.

The protective film further includes a base layer laminated on the protection layer to allow the protection layer to be disposed between the adhesive layer and the base layer.

The base layer includes at least one of polyethylene terephthalate PET, biaxially oriented polypropylene OPP, polycarbonate PC, polyamide PA, and polyurethane PU.

The protective film further includes a bonding layer disposed between the base layer and the protection layer.

The bonding layer includes at least one of an epoxy-based, urethane-based, rubber-based, and acrylic-based resin.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 10 is a table illustrating a composition of substances constituting a silicone adhesive of the protective film of FIG. 8 according to the third exemplary embodiment;

FIG. 11 is a table illustrating curing temperatures of the layers of the protective film of FIG. 8 according to the third exemplary embodiment.

DETAILED DESCRIPTION

Figure 1:
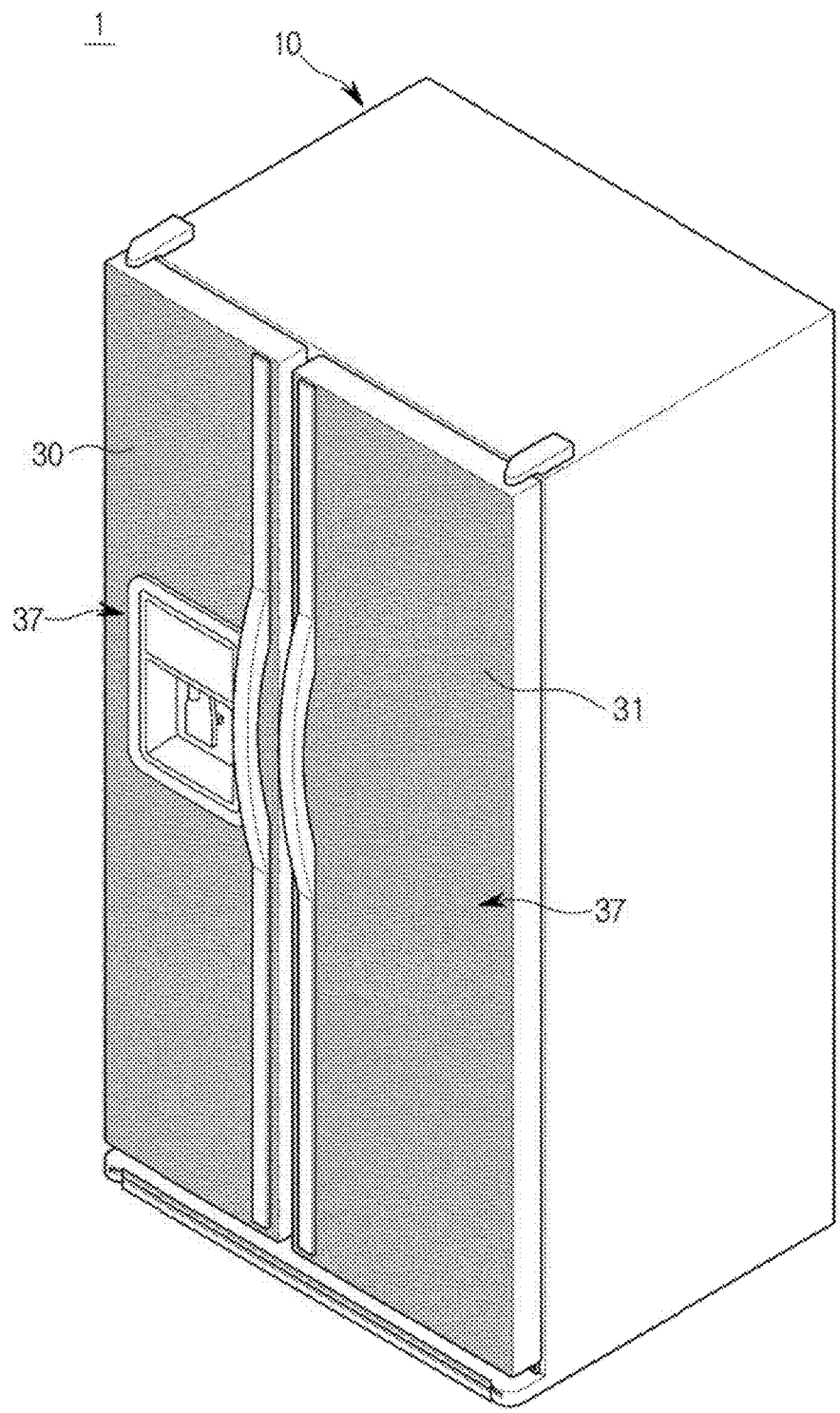
FIG. 1 is a schematic view illustrating an electronic appliance according to an embodiment.

Reference will now be made in detail to the embodiments of the present disclosure, examples of which are illustrated in the accompanying drawings, wherein like reference numerals refer to like elements throughout. Meanwhile, the terms "front end", "rear end", "upper", "lower", "upper end", and lower end", and the like used throughout the specification are defined based on the drawings and the shape and position of each element are not limited by these terms.

Protective films may be used to protect surfaces of electronic appliances from scratches or contamination while the electronic appliances are processed, transported, or stored. Particularly, the protective films may be used to protect surfaces of electronic appliances made of metals. In this case, electronic appliances to which the protective films are applicable may be any electronic appliance having at least one portion of the surface thereof made of a metal. For example, the electronic appliances may include refrigerators, washing machines, ovens, and the like. Also, the protective films may be used to protect surfaces of various products such as automobiles as well as electronic appliances. Hereinafter, a refrigerator 1 will be described as an example of the electronic appliance according to an embodiment.

Figure 2:
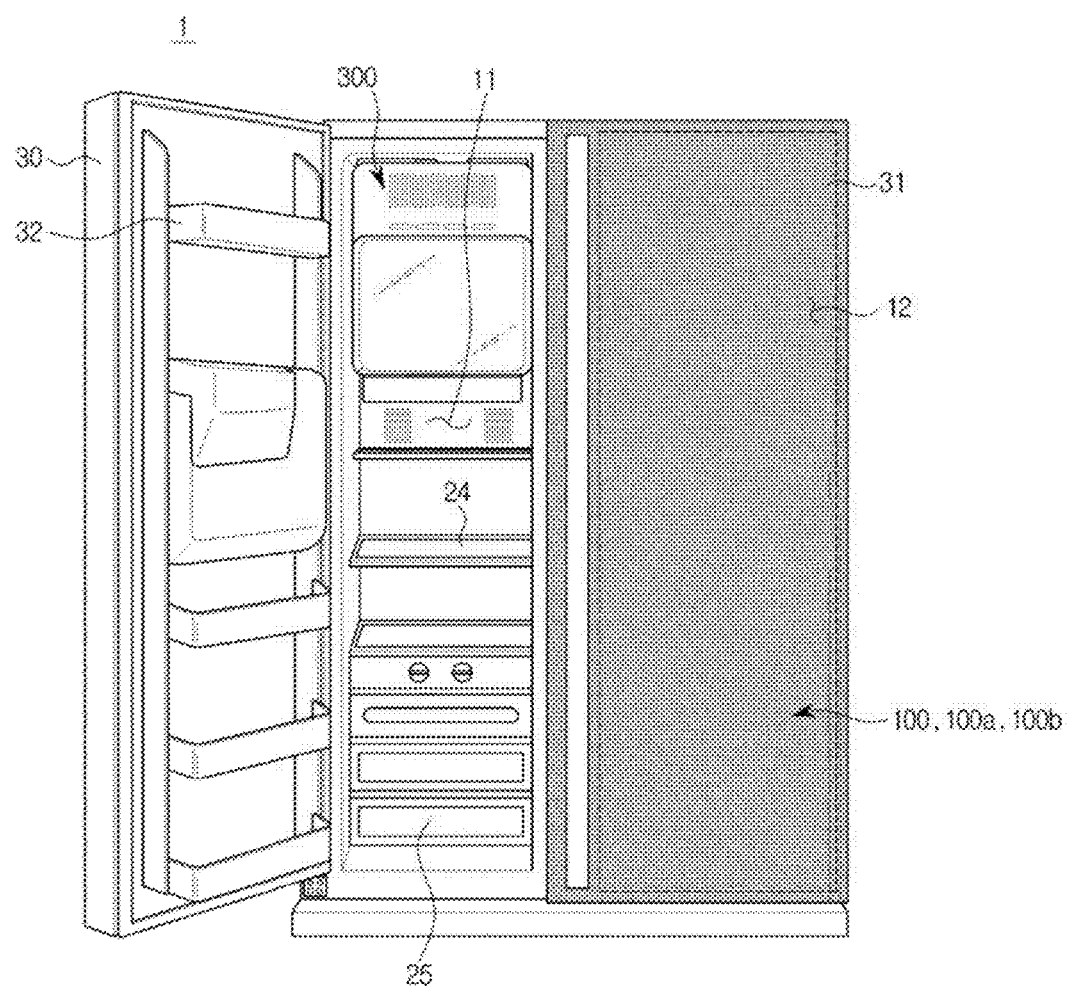
FIG. 2 is a schematic view illustrating the electronic appliance of FIG. 1 viewed at a different angle.

FIG. 1 is a schematic view illustrating an electronic appliance according to an embodiment. FIG. 2 is a schematic view illustrating the electronic appliance of FIG. 1 viewed at a different angle. Hereinafter, an inner space may be used to include storage compartments 11 and 12.

As illustrated in FIGS. 1 and 2, the refrigerator 1 may include a main body 10 defining an appearance. The main body 10 may include an inner case defining the storage compartments 11 and 12, an outer case coupled to outer surfaces of the inner case and defining the appearance of the refrigerator 1, and a foam insulation disposed between the inner case and the outer case.

The refrigerator 1 may further include the storage compartments 11 and 12 formed inside the main body 10 to store food. Particularly, the storage compartments 11 and 12 may be formed inside the inner case.

The refrigerator 1 may further include a cool air supply device configured to supply cool air into the storage compartments 11 and 12 to keep food stored in the storage compartments 11 and 12 fresh. The cool air supply device may include a compressor configured to compress a refrigerant to a high pressure, a condenser configured to condense the compressed refrigerant, an expansion device configured to expand the refrigerant to a low pressure, an evaporator configured to generate cool air by evaporating the refrigerant, and a refrigerant pipe configured to guide the refrigerant.

The storage compartments 11 and 12 may be partitioned into a left storage compartment 11 and a right storage compartment 12 by a barrier wall (not shown). The left storage compartment 11 may be used as a freezer compartment to store food in a frozen state and the right storage compartment 12 may be used as a refrigerator compartment to store food in a chilled state. The barrier wall may include an insulation to block heat exchange between the left storage compartment 11 and the right storage compartment 12.

The storage compartments 11 and 12 may have open fronts to put/take food into/out of the storage compartments 11 and 12.

At least one shelf 24 may be disposed in the storage compartments 11 and 12 to place food thereon. The inner space of the storage compartments 11 and 12 may be vertically divided by the at least one shelf 24. In addition, the storage compartments 11 and 12 may be provided with at least one basket 25 to accommodate food.

The refrigerator 1 may further include doors 30 and 31 rotatably installed at the main body 10 to open or close the open fronts of the storage compartments 11 and 12. Particularly, the doors 30 and 31 may be rotatably hinged to the main body 10. The doors 30 and 31 may include a left door 30 configured to open or close the left storage compartment 11 and a right door 31 configured to open or close the right storage compartment 12. The doors 30 and 31, together with the main body 10, may define the appearance of the refrigerator 1.

A plurality of door shelves 32 to store food may be installed on the inner surfaces of the left door 30 and the right door 31.

The refrigerator 1 may further include an ice making device 300 to make ice.

The refrigerator 1 may further include a dispenser 37 to dispense water or ice without opening the doors 30 and 31.

The dispenser 37 may be disposed at the doors 30 and 31. For example, the dispenser 37 may be provided at the left door 30.

The refrigerator 1 may further include a protective film 100, 100a, or 100b. The protective film 100, 100a, or 100b may be detachably adhered to at least one portion of the surface of the refrigerator 1. Assuming that the main body 10 includes the doors 30 and 31, the protective film 100, 100a, or 100b may be detachably adhered to at least one portion of the main body 10. If the main body 10 is regarded as a separate component from the doors 30 and 31, the protective film 100, 100a, or 100b may be detachably adhered to at least one of the main body 10 and the doors 30 and 31. Preferably, the protective film 100, 100a, or 100b may be detachably adhered to at least one portion of the surfaces of the doors 30 and 31.

In another aspect, assuming that the main body 10 includes the doors 30 and 31, the main body 10 may have a metallic region. In this case, the protective film 100, 100a, or 100b may be detachably adhered to at least one portion of the metallic region. If the main body 10 is regarded as a separate component from the doors 30 and 31, each of the main body 10 and the doors 30 and 31 may have a metallic region. In this case, the protective film 100, 100a, or 100b may be detachably adhered to at least one of at least one portion of the metallic region of the main body 10 and at least one portion of the doors 30 and 31. Preferably, the protective film 100, 100a, or 100b may be detachably adhered to at least one portion of the metallic region of the doors 30 and 31.

The protective films 100, 100a, and 100b will be described in more detail later.

Figure 3:
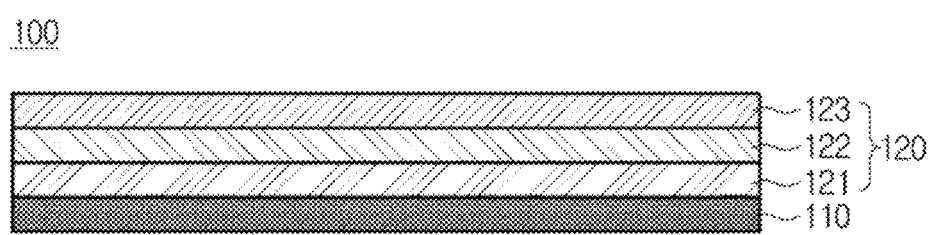
FIG. 3 is a view illustrating a protective film according to a first exemplary embodiment of the present disclosure.
Figure 4A:
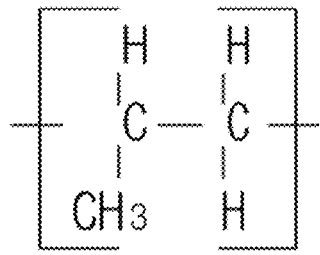
FIG. 4A is a diagram illustrating a chemical structure of a resin constituting a first layer of the protective film according to the first exemplary embodiment of FIG. 3.
Figure 4A:
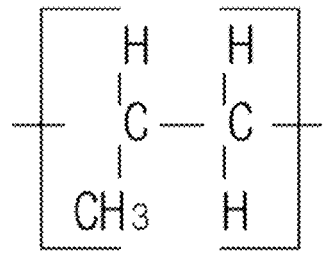
Figure 4A:
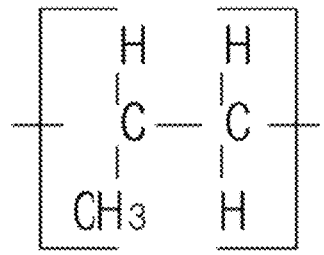
Figure 4B:
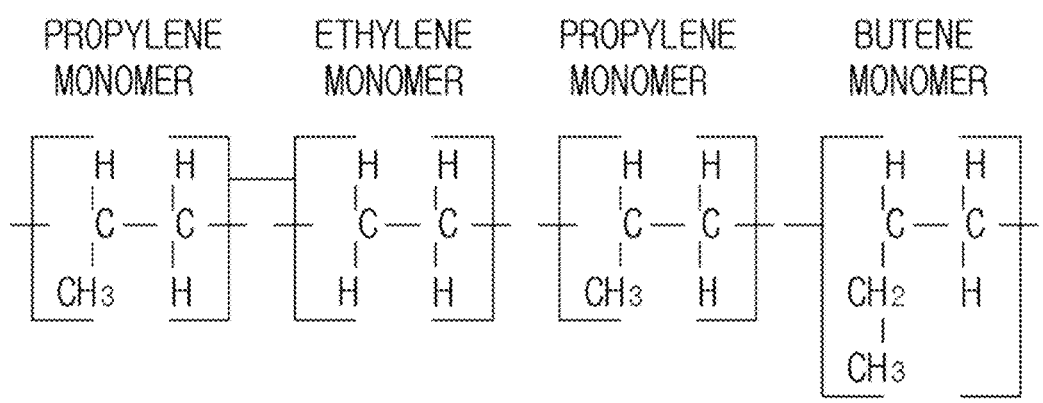
FIG. 4B is a diagram illustrating a chemical structure of a resin constituting a second layer of the protective film according to the first exemplary embodiment of FIG. 3.
Figure 4C:
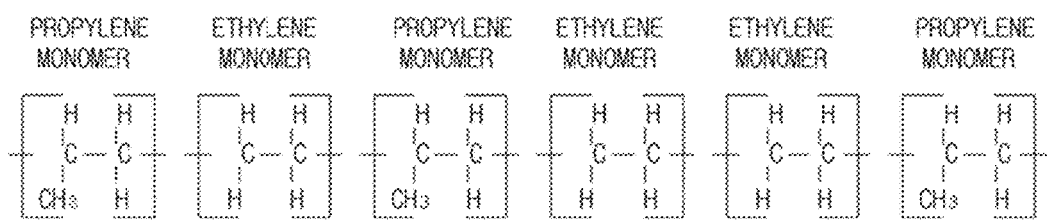
FIG. 4C is a diagram illustrating a chemical structure of a resin constituting a third layer of the protective film according to the first exemplary embodiment of FIG. 3.

FIG. 3 is a view illustrating a protective film according to a first exemplary embodiment of the present disclosure. FIG. 4A is a diagram illustrating a chemical structure of a resin constituting a first layer of the protective film according to the first exemplary embodiment of FIG. 3. FIG. 4B is a diagram illustrating a chemical structure of a resin constituting a second layer of the protective film according to the first exemplary embodiment of FIG. 3. FIG. 4C is a diagram illustrating a chemical structure of a resin constituting a third layer of the protective film according to the first exemplary embodiment of FIG. 3.

As illustrated in FIG. 3, the protective film 100 may include a protection layer 120 and an adhesive layer 110.

The protection layer 120 may have flexibility. In addition, the protection layer 120 may have excellent chemical resistance. The protection layer 120 may be formed of a soft resin.

The protection layer 120 may include polyolefin. The polyolefin may include at least one of oriented polypropylene PP, polyethylene PE and polyurethane PU.

The protection layer 120 may include a plurality of layers.

The protection layer 120 may include a first layer 121. The first layer 121 may be laminated on the adhesive layer 110. Since the first layer 121 may be laminated on the adhesive layer 110, the first layer 121 may have heat resistance and curing properties suitable for curing the adhesive layer 110. In other words, the first layer 121 may have heat resistance and curing properties suitable for curing silicone adhesive. As illustrated in FIG. 4A, the first layer 121 may include random-polypropylene. The first layer 121 may be corona-treated. The random-polypropylene may include a resin in which propylene monomers and ethylene monomers are randomly polymerized. According to the ASTM D1248 standard, the random-polypropylene may have a melt index of from 0.1 to 10 g/10 min and a density of from 0.900 to 0.905 g/cm.

Preferably, the first layer 121 may be formed of a resin that does not include amine and compounds thereof, sulfur and compounds thereof, organotin and compounds thereof, an organic additive, and an inorganic additive. This is because, platinum (Pt) involved in a curing process of the adhesive layer 110 may undergo addition reaction with these substances. Particularly, platinum (Pt) involved in the curing process of silicon adhesive may undergo addition reaction with these substances, thereby hindering the silicon adhesive from curing.

The protection layer 120 may further include a third layer 123. As illustrated in FIG. 4C, the third layer 123 may include homo-polypropylene. The homo-polypropylene may include a resin polymerized only with propylene monomers. According to the ASTM D1248 standard, homo-polypropylene may have a melt index of from 0.01 to 30 g/10 min and a density of from 0.900 to 0.905 g/cm.

The protection layer 120 may further include a second layer 122. The second layer 122 may be formed of a resin capable of improving tearableness, deep drawing and tear resistance. The second layer 122 may be disposed between the first layer 121 and the third layer 123. As illustrated in FIG. 4B, the second layer 122 may include ter-polypropylene. Ter-polypropylene may include a resin in which propylene monomers, ethylene monomers, and butene monomers are randomly polymerized. According to the ASTM D1248 standard, ter-polypropylene may have a melt index of from 0.1 to 10 g/10 min and a density of from 0.900 to 0.905 g/cm.

The protection layer 120 may be formed by a coextrusion process. In other words, the protection layer 120 including the first layer 121, the second layer 122, and the third layer 123 may be formed by a coextrusion process. Thus, the protection layer 120 may have a small thickness deviation and fish-eyes and gels may be reduced.

The coextrusion process is an extrusion process of manufacturing a multi-layered film by melting heterogeneous or homogeneous substances using a plurality of extruders, discharging the melt substances into multiple layers by a feedblock method or a multi-manifold method, and elongating or casting the discharged product.

A coextrusion device may include a plurality of extruders to melt resins having different properties and supply the molten resins, a plurality of supply pipes installed to supply the molten resins received from the plurality of extruders, and a coextrusion die to discharge the molten resins received from the plurality of supply pipes in a sheet form. The plurality of extruders may include micro filters. The micro filters may include a disk type, a leaf type, a wirenet type, and the like. In addition, one surface or both surfaces of the micro filter may be reinforced by a mesh.

Specifically, a method of manufacturing the protection layer 120 may include coextruding molten resins respectively constituting the first layer 121, the second layer 122, and the third layer 123 in a film form by using a T-die and cooling the coextruded molten product in the film form by using a cooling roll.

A thickness ratio of the first layer 121, the second layer 122, and the third layer 123 may be 1 to 4:2 to 8:1 to 4.

The adhesive layer 110 may have a small surface energy. In addition, the adhesive layer 110 may have excellent heat resistance, oil resistance, and airtightness.

The adhesive layer 110 may be laminated on the protection layer 120. Particularly, the adhesive layer 110 may be laminated on the first layer 121 of the protection layer 120.

The adhesive layer 110 may include silicone adhesive.

The silicone adhesive may include a low-temperature curing silicone adhesive. Specifically, the silicone adhesive may include a low-temperature curing silicone adhesive that cures at a temperature of from 65° C. to 95° C.

The silicone adhesive may have heat resistance at a temperature of 200° C. or less.

Figure 5:
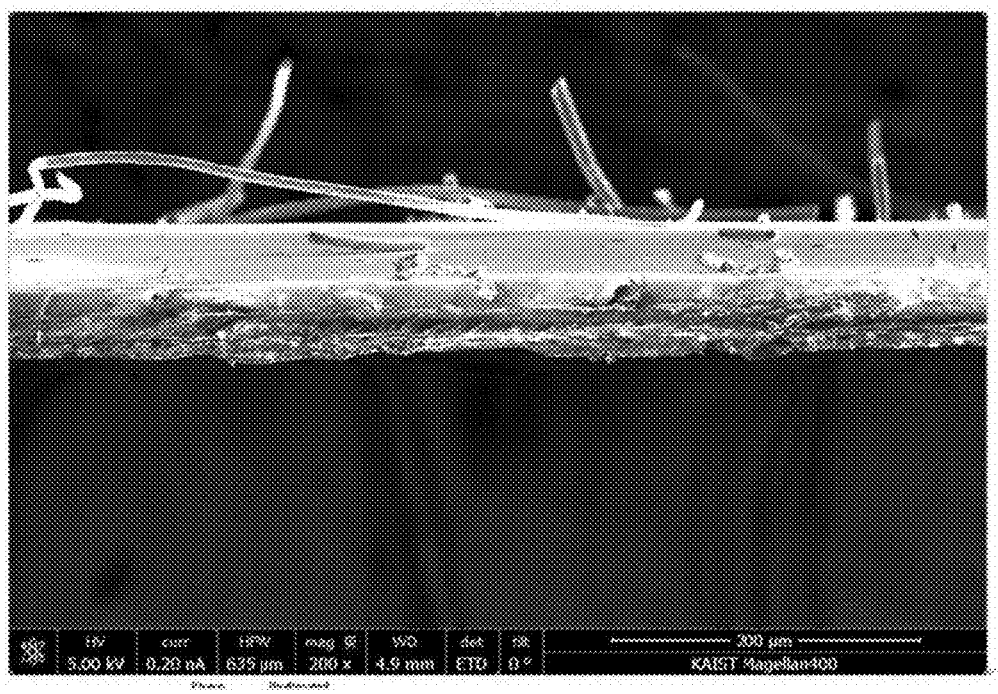
FIG. 5 is a scanning electron microscopic (SEM) image of resins constituting a protection layer of the protective film according to the first exemplary embodiment.

FIG. 5 is a scanning electron microscopic (SEM) image of resins constituting the protection layer of the protective film according to the first exemplary embodiment. Particularly, FIG. 5 is an SEM image of terephthalate polyolefin as an example of polyolefin.

As is apparent from FIG. 5, the protection layer 120 may include a plurality of layers. Particularly, the protection layer 120 may include the first layer 121, the second layer 122, and the third layer 123.

Figure 6:
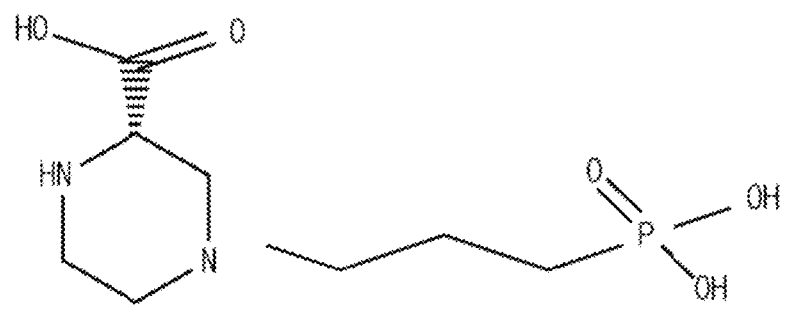
FIG. 6 is a diagram illustrating a chemical structure of a resin excluded from the types of resins constituting the protection layer of the protective film FIG. 3 according to the first exemplary embodiment.

FIG. 6 is a diagram illustrating a chemical structure of a resin excluded from the types of resins constituting the protection layer of the protective film FIG. 3 according to the first exemplary embodiment.

Polyolefin having the chemical structure shown in FIG. 6 is excluded from the types of polyolefin constituting the protection layer 120. In other words, polyolefin including at least one element of nitrogen (N), sulfur (S), and phosphorus (P) is not suitable as polyolefin constituting the protection layer 120. A Pt catalyst involved in curing of the low-temperature curing silicone adhesive reacts with nitrogen (N), sulfur (S), or phosphorus (P) serving as a component hindering curing of the low-temperature curing silicone adhesive, i.e., a catalytic poison. Thus, polyolefin constituting the protection layer 120 may not include any element of nitrogen (N), sulfur (S), and phosphorus (P).

Figure 7:
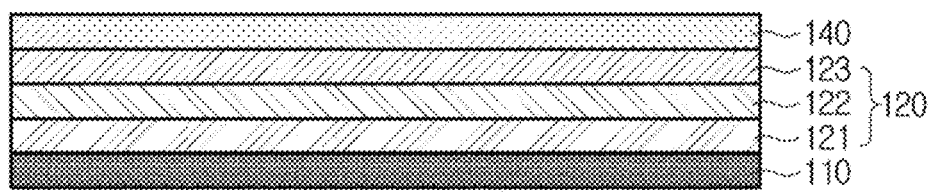
FIG. 7 is a view illustrating a protective film according to a second exemplary embodiment of the present disclosure.

FIG. 7 is a view illustrating a protective film according to a second exemplary embodiment of the present disclosure.

As illustrated in FIG. 7, the protective film 100a may include a protection layer 120 and an adhesive layer 110. The protection layer 120 and the adhesive layer 110 are described above with reference to the protective film 100 according to the first exemplary embodiment, and thus detailed descriptions thereof will not be repeated.

The protective film 100a may further include a base layer 140. The base layer 140 may have excellent tensile strength, impact resistance, cold resistance, and heat resistance. The base layer 140 may be formed of a hard resin.

The base layer 140 may be laminated on the protection layer 120 such that the protection layer 120 is disposed between the base layer 140 and the adhesive layer 110. That is, the base layer 140 may be laminated on one surface of the protection layer 120 and the adhesive layer 110 may be laminated on the other surface of the protection layer 120 such that the protection layer 120 is interposed between the base layer 140 and the adhesive layer 110. Specifically, the base layer 140 may be laminated on the third layer 123 of the protection layer 120 and the adhesive layer 110 may be laminated on the first layer 121 of the protection layer 120.

The base layer 140 may include at least one of polyethylene terephthalate PET, biaxially oriented polypropylene OPP, polycarbonate PC, polyamide PA, and polyurethane PU.

Figure 8:
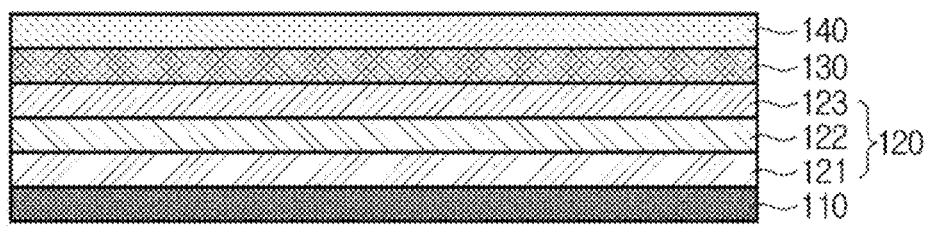
FIG. 8 is a view illustrating a protective film according to a third exemplary embodiment of the present disclosure.

FIG. 8 is a view illustrating a protective film according to a third exemplary embodiment of the present disclosure.

As illustrated in FIG. 8, the protective film 100b may include a protection layer 120 and an adhesive layer 110. The protection layer 120 and the adhesive layer 110 are described above with reference to the protective film 100 according to the first exemplary embodiment, and thus detailed descriptions thereof will not be repeated.

The protective film 100b may further include a base layer 140. The base layer 140 may have excellent tensile strength, impact resistance, cold resistance, and heat resistance. The base layer 140 may be formed of a hard resin.

The base layer 140 may be laminated on the protection layer 120 such that the protection layer 120 is disposed between the base layer 140 and the adhesive layer 110.

The base layer 140 may include at least one of polyethylene terephthalate PET, biaxially oriented polypropylene OPP, polycarbonate PC, polyamide PA, and polyurethane PU.

The protective film 100b may further include a bonding layer 130. The bonding layer 130 may be disposed between the base layer 140 and the protection layer 120. Specifically, the bonding layer 130 may be disposed between the base layer 140 and the third layer 123 of the protection layer 120. In other words, the bonding layer 130 may be laminated on the third layer 123 of the protection layer 120 to be interposed between the base layer 140 and the protection layer 120. In this case, the adhesive layer 110 may be laminated on the first layer 121 of the protection layer 120.

In conclusion, the protective film 100b may have a structure in which the adhesive layer 110, the first layer 121 of the protection layer 120, the second layer 122 of the protection layer 120, and the third layer 123 of the protection layer 120, the bonding layer 130, and the base layer 140 are sequentially laminated.

The bonding layer 130 may include at least one of an epoxy-based, urethane-based, a rubber-based, and acrylic-based resin.

A thickness ratio of the layers in the protective film 100b is as follows.

Assuming that a total thickness of the protective film 100b is 1, a thickness of the base layer 140 may be from 0.1 to 0.25.

Assuming that the total thickness of the protective film 100b is 1, a thickness of the bonding layer 130 may be 0.08 or less.

Assuming that the total thickness of the protective film 100b is 1, a thickness of the protection layer 120 may be from 0.1 to 0.25.

Assuming that the total thickness of the protective film 100b is 1, a thickness of the adhesive layer 110 may be from 0.1 to 0.5.

Figure 9:
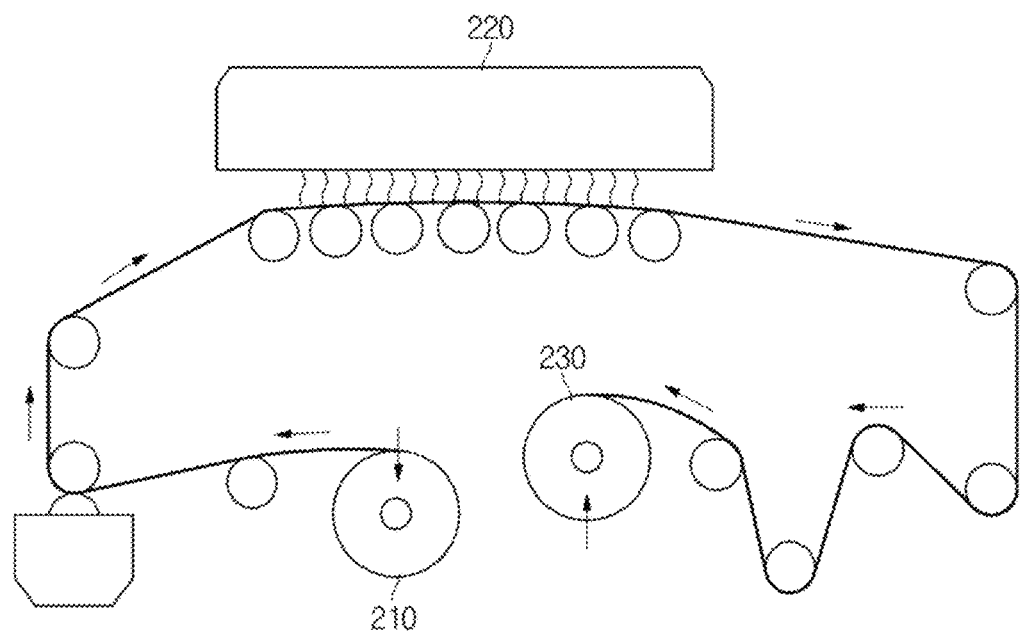
FIG. 9 is a diagram schematically illustrating a process of manufacturing the protective film according to the third exemplary embodiment.

FIG. 9 is a diagram schematically illustrating a process of manufacturing the protective film according to the third exemplary embodiment. FIG. 10 is a table illustrating a composition of substances constituting a silicone adhesive of the protective film of FIG. 8 according to the third exemplary embodiment. FIG. 11 is a table illustrating curing temperature of the layers of the protective film of FIG. 8 according to the third exemplary embodiment.

As illustrated in FIG. 9, the method of manufacturing the protective film 100b may include unwinding a film wound on a feeding roller 210. In this case, the film may have a structure in which the protection layer 120, the bonding layer 130, and the base layer 140 are sequentially laminated. The film may be wound on the feeding roller 210 in a direction such that silicon adhesive is coated on to the first layer 121 of the protection layer 120 during a micro gravure rolling process which will be described later.

The method of manufacturing the protective film 100b may further include micro gravure rolling. Specifically, the method of manufacturing the protective film 100b may further include coating the silicone adhesive on the first layer 121 of the protection layer 120 by a micro gravure rolling process. That is, the adhesive layer 110 may be formed on the first layer 121 of the protection layer 120 by the micro gravure rolling process.

The composition of substances for the silicone adhesive constituting the adhesive layer 110 may be identified in FIG. 10. Specifically, the silicone adhesive may include a low-temperature curing polymer, a diluent, a curing agent, and a primer. Assuming that a weight ratio of the low-temperature curing polymer is 100%, a weight ratio of the diluent may be from 300% to 500% based on that of the low-temperature curing polymer. The diluent may include at least one of methyl ethyl ketone (MEK), toluene, and ethyl acetate (EA). Assuming that the weight ratio of the low-temperature curing polymer is 100%, a weight ratio of the curing agent may be from 1% to 4% based on that of the low-temperature curing polymer. The curing agent may include platinum (Pt). When an amount of the curing agent it too low, the curing may not be appropriately performed. On the contrary, when the amount of the curing agent is too high, the silicone adhesive cures too quickly to perform the coating process of the silicon adhesive on the first layer 121 of the protection layer 120 smoothly. Assuming that a weight ratio of the low-temperature curing polymer is 100%, a weight ratio of the primer may be from 0.5% to 3% based on that of the low-temperature curing polymer.

The method of manufacturing the protective film 100b may further include curing the film coated with the silicone adhesive on the first layer 121 of the protection layer 120. The film coated with the silicone adhesive on the first layer 121 of the protection layer 120 may be cured while passing through a drying oven 220. In another aspect, the diluent contained in the silicon adhesive may be removed while passing through the drying oven 220.

Curing temperatures of the layers constituting the protective film 100b may be identified in FIG. 11 respectively. The base layer 140 may be cured at a temperature of from 60° C. to 80° C. The bonding layer 130 may be cured at a temperature of from 60° C. to 80° C. The third layer 123 of the protection layer 120 may be cured at a temperature of from 70° C. to 85° C. The second layer 122 of the protection layer 120 may be cured at a temperature of from 70° C. to 90° C. The first layer 121 of the protection layer 120 may be cured at a temperature of from 70° C. to 85° C. The adhesive layer 110 may be cured at a temperature of from 70° C. to 85° C.

The method of manufacturing the protective film 100b may further include winding the manufactured protective film 100b by using a collecting roller 230.

When the protective film 100b is adhered to the doors 30 and 31 of the refrigerator 1, an adhesive force of the protective film 100b may be as follows. In case of a door having a pattern, the protective film 100b may have an adhesive force of from 300 gf/inch to 800 gf/inch. In case of a door with no pattern, the protective film 100b may have an adhesive force of from 30 gf/inch to 800 gf/inch.

Figure 12A:
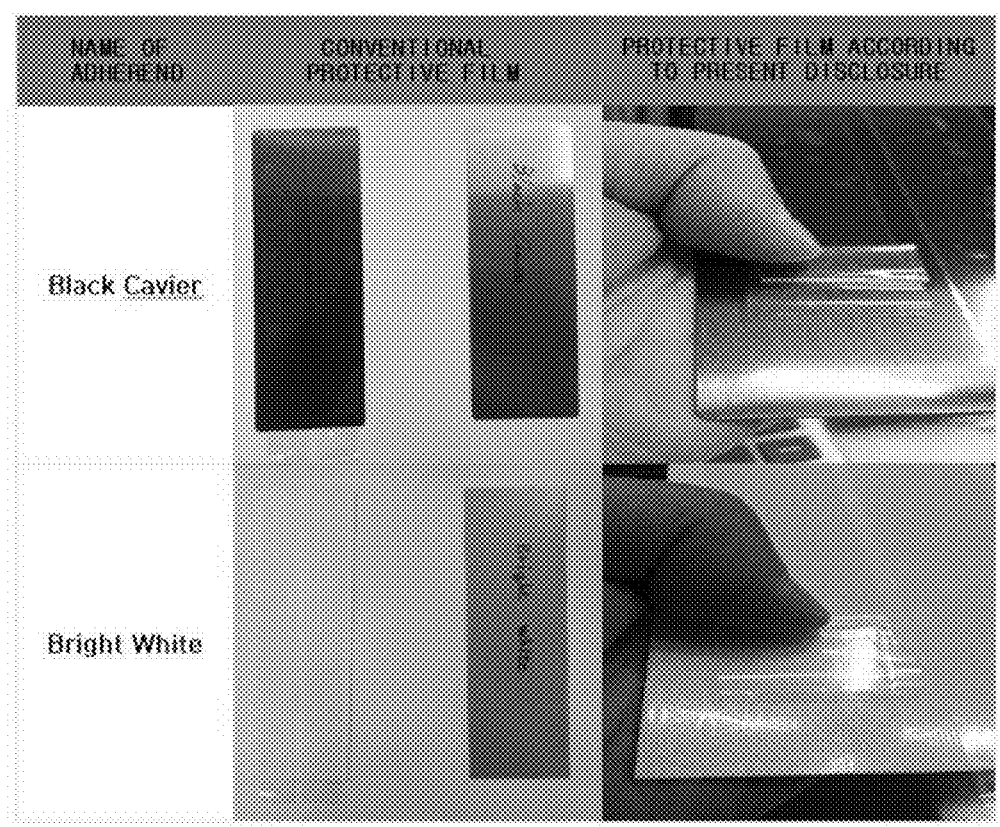
FIGS. 12A to 12C are tables illustrating the degrees of protection for adherends by conventional protective films and the protective film of FIG. 8 according to the third exemplary embodiment.
Figure 12B:
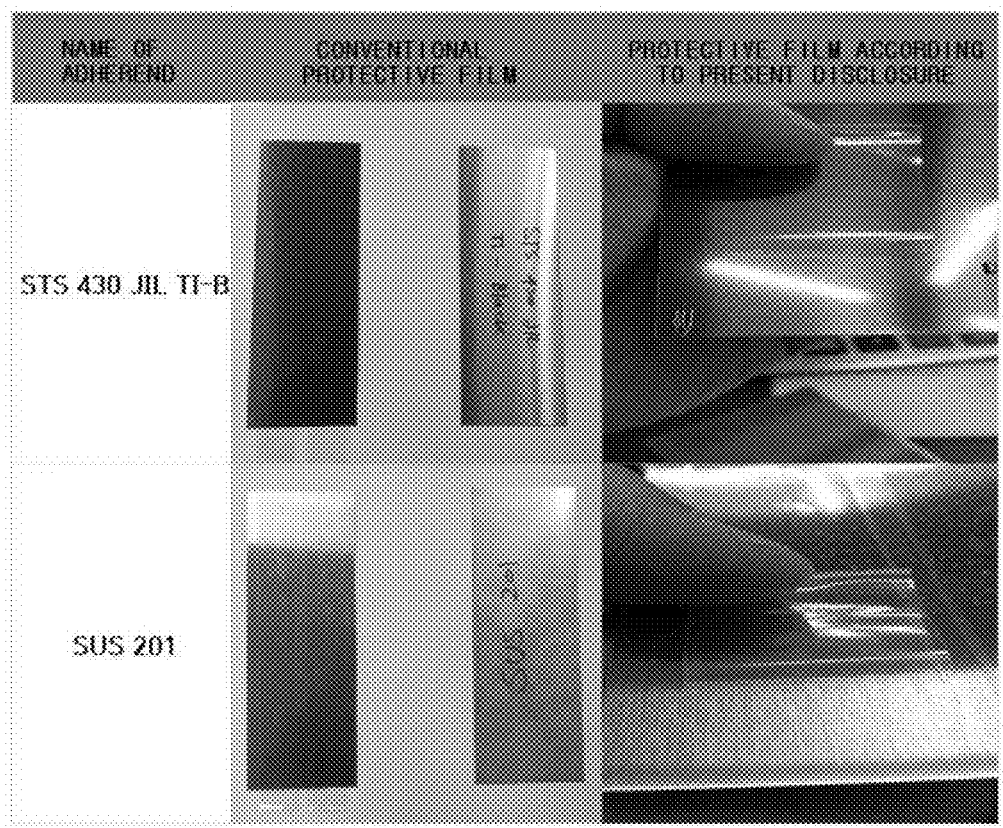
Figure 12C:
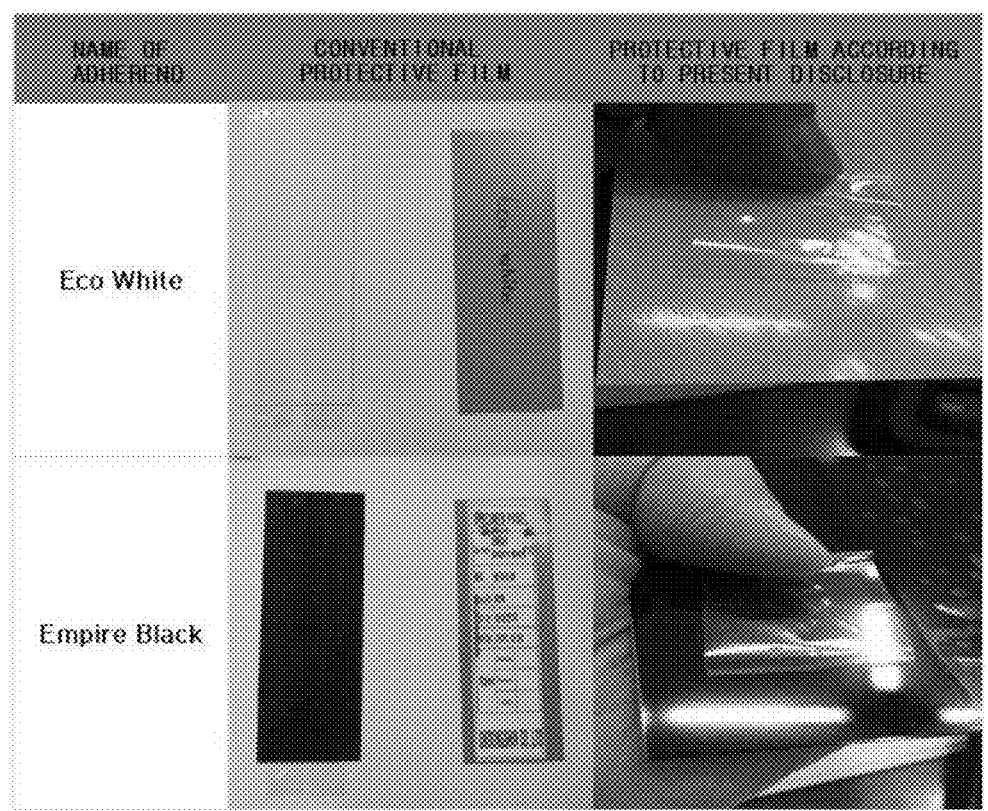

FIGS. 12A to 12C are tables illustrating the degrees of protection for adherends by conventional protective films and the protective film of FIG. 8 according to the third exemplary embodiment. FIGS. 12A to 12C show the degrees of protection for adherends by conventional protective films and the protective film according to the third exemplary embodiment when various types of refrigerator doors are used as the adherends. In this case, the base layer of the conventional protective films is formed of polyethylene PE and the adhesive layer of the conventional protective films is formed of acrylic.

Conventional protective films have limitations in protecting the adherends. As can be seen from FIGS. 12A to 12C, stains and residues remain on the adherends from which conventional protective films are detached therefrom. This is because the adhesive force of the conventional protective films to the adherends excessively increases over time. In addition, scratches or stains caused by impurities may remain on the adherends from which the conventional protective films are detached.

On the contrary, the adherends may be protected clean with no scratches by using the protective film 100b according to the third exemplary embodiment.

As is apparent from the above description, adherends may be effectively protected from stains, contamination by impurities, scratches, and residues by using the protective film including polyolefin and silicone adhesive.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A protective film comprising:
   a protection layer comprising polyolefin;
   an adhesive layer laminated on the protection layer and comprising a silicone adhesive;
   a base layer laminated on the protection layer to allow the protection layer to be disposed between the adhesive layer and the base layer; and
   a bonding layer disposed between the base layer and the protection layer.

2. The protective film according to claim 1, wherein the polyolefin comprises at least one of oriented polypropylene, polyethylene, and polyurethane.

3. The protective film according to claim 1, wherein the protection layer comprises:
   a first layer laminated on the adhesive layer and comprising random-polypropylene;
   a third layer comprising homo-polypropylene; and
   a second layer disposed between the first layer and the third layer and comprising ter-polypropylene.

4. The protective film according to claim 1, wherein the silicone adhesive comprises a low-temperature curing silicone adhesive.

5. The protective film according to claim 1, wherein the base layer comprises at least one of polyethylene terephthalate, biaxially oriented polypropylene, polycarbonate, polyamide, and polyurethane.

6. The protective film according to claim 1, wherein the bonding layer comprises at least one of an epoxy-based, urethane-based, rubber-based, and acrylic-based resin.

7. The protective film according to claim 4, wherein the low-temperature curing silicone adhesive cures at a temperature of from 65° C. to 95° C.

8. The protective film according to claim 4, wherein the low-temperature curing silicone adhesive has heat resistance at a temperature of 200° C. or less.

9. An electronic appliance comprising:
   a main body configured to define an appearance;
   an inner space formed inside the main body; and
   a protective film detachably adhered to at least one portion of the main body,
   wherein the protective film comprises:

a protection layer comprising polyolefin;

an adhesive layer laminated on the protection layer and comprising a silicone adhesive; and a base layer laminated on the protection layer to allow the protection layer to be disposed between the adhesive layer and the base layer.

10. The electronic appliance according to claim 9, wherein the main body has a metallic region, and the protective film is adhered to at least one portion of the metallic region.

11. The electronic appliance according to claim 9, wherein the polyolefin comprises at least one of oriented polypropylene, polyethylene, and polyurethane.

12. The electronic appliance according to claim 9, wherein the protection layer comprises:

a first layer laminated on the adhesive layer and comprising random-polypropylene;

a third layer comprising homo-polypropylene; and a second layer disposed between the first layer and the third layer and comprising ter-polypropylene.

13. The electronic appliance according to claim 12, wherein the first layer, the second layer, and the third layer have a thickness ratio of 1 to 4:2 to 8:1 to 4.

14. The electronic appliance according to claim 9, wherein the silicone adhesive comprises a low-temperature curing silicone adhesive curing at a temperature of from 65° C. to 95° C.

15. The electronic appliance according to claim 9, wherein the base layer comprises at least one of polyethylene terephthalate PET, biaxially oriented polypropylene OPP, polycarbonate PC, polyamide PA, and polyurethane PU.

16. The electronic appliance according to claim 9, wherein the protective film further comprises a bonding layer disposed between the base layer and the protection layer.

17. The electronic appliance according to claim 16, wherein the bonding layer comprises at least one of an epoxy-based, urethane-based, rubber-based, and acrylic-based resin.

18. A protective film comprising:

a protection layer comprising polyolefin; and an adhesive layer laminated on the protection layer and comprising a silicone adhesive, wherein the protection layer comprises:

a first layer laminated on the adhesive layer and comprising random-polypropylene;

a third layer comprising homo-polypropylene; and a second layer disposed between the first layer and the third layer and comprising ter-polypropylene.

* * * * *